United States Patent
Yokawa

(10) Patent No.: US 8,823,884 B2
(45) Date of Patent: Sep. 2, 2014

(54) FLAT PANEL DISPLAY

(75) Inventor: Akira Yokawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 701 days.

(21) Appl. No.: 12/632,799

(22) Filed: Dec. 8, 2009

(65) Prior Publication Data

US 2010/0149440 A1 Jun. 17, 2010

(30) Foreign Application Priority Data

Dec. 11, 2008 (JP) ................. 2008-316096

(51) Int. Cl.
 *H04N 5/64* (2006.01)
 *F16M 11/22* (2006.01)
 *F16M 11/00* (2006.01)

(52) U.S. Cl.
 CPC .............. *H04N 5/64* (2013.01); *F16M 11/22* (2013.01); *F16M 2200/08* (2013.01); *F16M 11/00* (2013.01)
 USPC ........................................................ 348/836

(58) Field of Classification Search
 USPC ................................... 348/836–843
 See application file for complete search history.

(56) References Cited

U.S. PATENT DOCUMENTS

| | | | |
|---|---|---|---|
| 5,284,371 A * | 2/1994 | Richardson et al. | 292/149 |
| 7,984,888 B2 * | 7/2011 | Park | 248/281.11 |
| 8,094,243 B2 | 1/2012 | Yokawa | |
| 2002/0149906 A1 | 10/2002 | Ichimura | |
| 2004/0027498 A1 | 2/2004 | Huber | |
| 2004/0155166 A1 | 8/2004 | Kim | |
| 2005/0236548 A1 * | 10/2005 | Maruta | 248/476 |
| 2005/0285990 A1 | 12/2005 | Havelka | |
| 2007/0046840 A1 * | 3/2007 | Yokawa | 348/794 |

FOREIGN PATENT DOCUMENTS

| | | |
|---|---|---|
| EP | 1617314 A | 1/2006 |
| EP | 1876508 A | 1/2008 |
| EP | 2166428 A | 3/2010 |
| JP | 3107250 U | 12/2004 |
| JP | 3116087 U | 10/2005 |
| JP | 3118275 U | 12/2005 |
| JP | 2007-108345 A | 4/2007 |
| JP | 2007-310318 A | 11/2007 |
| JP | 2008-102286 A | 5/2008 |
| JP | 2008-129390 A | 6/2008 |

OTHER PUBLICATIONS

The extended European search report dated Apr. 7, 2010.

* cited by examiner

*Primary Examiner* — Dave Czekaj
*Assistant Examiner* — Tracy Li
(74) *Attorney, Agent, or Firm* — Yokoi & Co., U.S.A., Inc.; Toshiyuki Yokoi

(57) ABSTRACT

The present invention discloses a flat panel display includes a main body having a cabinet that forms a display window on a front side and a display panel contained in the cabinet, a stand located beneath said main body, and a supporting member that is fixed with said stand and supports said main body by fixing a back of said display panel at a position above said stand. The supporting member has a stand fixation part that is fixed with said stand. The supporting member has a back fixation portion to fix the back of said display panel at a position above said stand fixation part. The supporting member is formed to protrude upward from said stand and shift a center of gravity of said display panel rearward.

11 Claims, 19 Drawing Sheets

REAR ←→ FRONT

RIGHT ←——→ LEFT

COMPARATIVE EXAMPLE

REAR ←——→ FRONT

COMPARATIVE EXAMPLE

FLAT PANEL DISPLAY

CROSS-REFERENCES TO RELATED APPLICATIONS

The present application is related to the Japanese Patent Application No. 2008-316096, filed on Dec. 11, 2008, the entire disclosure of which is expressly incorporated by reference herein.

BACKGROUND OF THE INVENTION

1. Field of the Invention

This invention relates to a flat panel display which supports a main body of a flat panel display by a support means fixed on a stand.

2. Description of Related Art

A flat panel display is disclosed in Japanese Patent Laid-Open No. 2007-310,318 gazette. The flat panel display supports a housing by a stand and the housing contains a liquid crystal display panel. The housing of the flat panel display has an opening to insert a pillar of the from bottom side. On the back of the liquid crystal display panel, metal fittings to insert the upper end of the pillar of the stands are equipped. Therefore, the liquid crystal display panel will be fixed on the front side of the pillar of the stand.

Another liquid crystal television is disclosed in Japanese Patent Laid-Open No. 2007-108,345 gazette. The liquid crystal television supports a main body of a liquid crystal television by a stand and the main body liquid crystal television contains a liquid crystal display panel in a cabinet. The back cabinet comprises two parts. They are a main body of the cabinet with a T-shaped recession at lower back portion, and a closure to close the recession. The pillar of the stands is located behind the closure. Therefore, the liquid crystal display panel will be fixed on the front side of the pillar of the stand.

Another liquid crystal display is disclosed in Japanese Patent Laid-Open No. 2008-102,286 gazette. The liquid crystal display supports a main body of a liquid crystal display by a stand and the main body of the liquid crystal display contains the liquid crystal display panel in a cabinet. On the lower back portion of the liquid crystal display panel, a bracket made by a metal plate which extends downward is equipped. A support portion is equipped with the stand to insert the bracket which extends downward. Therefore, a liquid crystal display panel will be fixed on the front side of the support portion.

A plasma television is disclosed in the 3118275th utility model registration bulletin. The plasma television supports a main body of the plasma television by a pair of twin legs and the main body contains a plasma display panel in a cabinet. A pair of bridge-type flame which is turned its longitudinal direction along vertical direction and connects upper part and lower part are equipped on the back of the plasma display panel. Pillars of each leg are inserted into each of the bridge-type flames. Therefore, the plasma display panel will be fixed on the front side of the pillar of the stand.

A flat panel display is required to shorten length in back and forth. In order to shorten the length of the stand in back and forth, it is required to improve stability of the flat display panel.

BRIEF SUMMARY OF THE INVENTION

The present invention discloses offering a flat panel display with improved steadiness.

One aspect of the present invention provides a flat panel display, comprising:

a main body having a cabinet that forms a display window on a front side and a display panel contained in the cabinet;

a stand located beneath said main body;

a supporting member that is fixed with said stand and supports said main body by fixing a back of said display panel at a position above said stand;

said supporting member has a stand fixation part that is fixed with said stand;

said supporting member has a back fixation portion to fix the back of said display panel at a position above said stand fixation part; and said supporting member is formed to protrude upward from said stand and shift a center of gravity of said display panel rearward.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

(1) The Explanation of the Flat Panel Display

Figure 1:
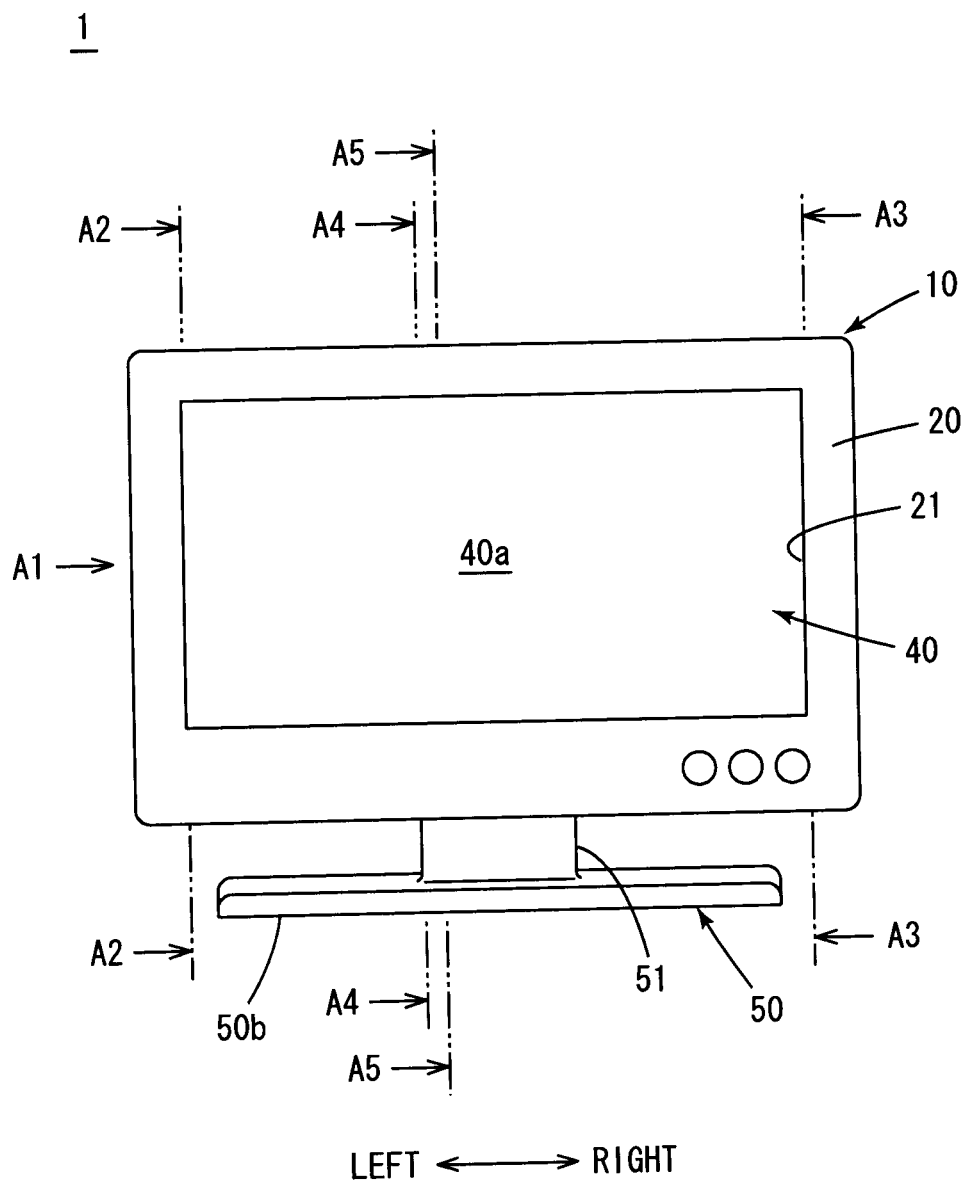
FIG. 1 is an exemplary illustration of a front view showing a flat panel display.
Figure 2:
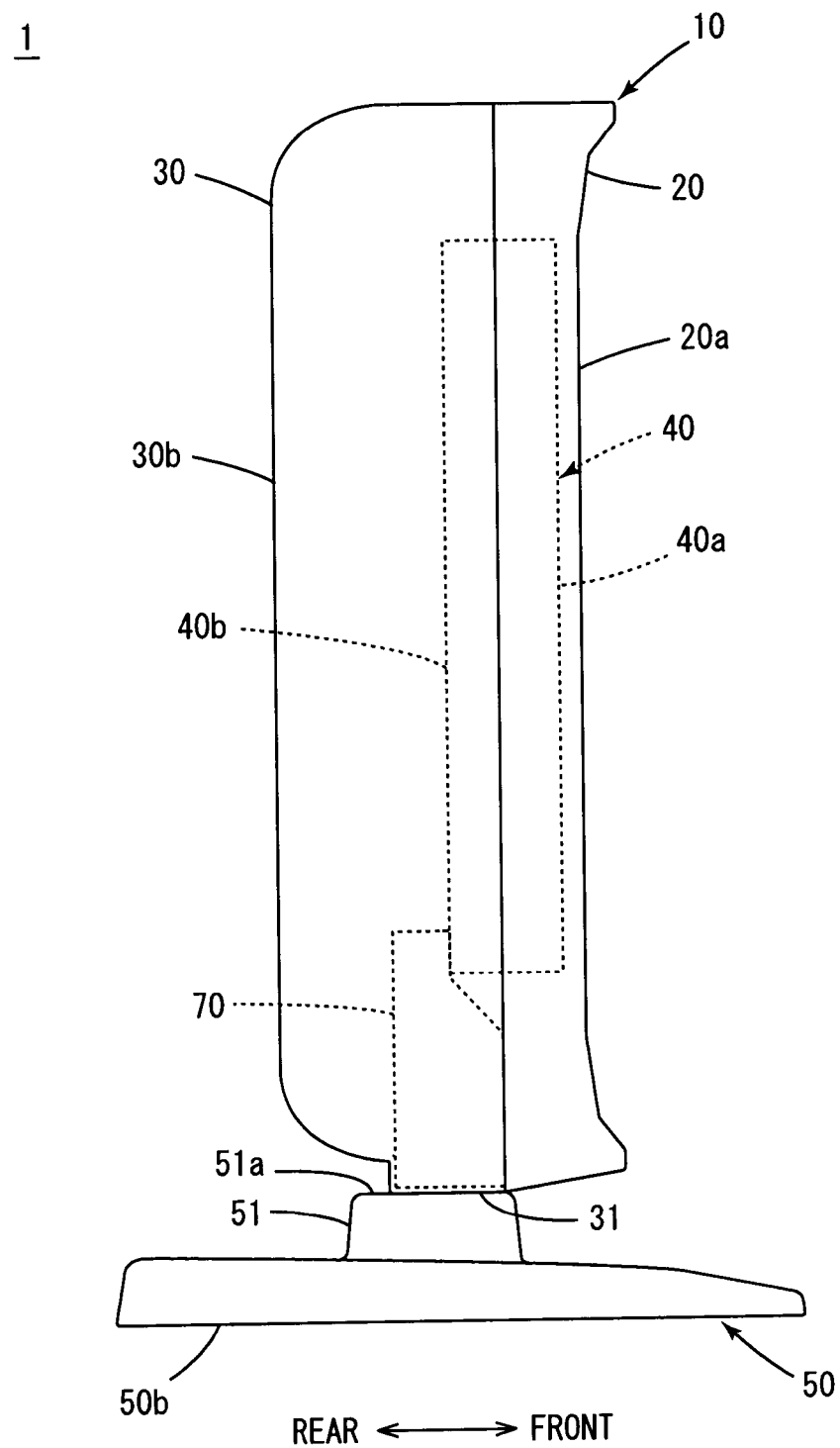
FIG. 2 is an exemplary illustration of a left side view showing the flat panel display in FIG. 1 seen from A1 direction in FIG. 1.

FIG. 1 is a front elevation showing a liquid crystal television 1 (a flat panel display) constituting an embodiment of the present invention. Hereinafter, a liquid crystal television will be referred as a TV. In addition, the upper and lower, right and left relation is explained based on the direction where the TV 1 is viewed from the front as shown in FIG. 1.

At first, an outline of TV 1 will be explained as follows.

TV 1 comprises a main body 10 of a television 1, a stand 50 and a supporting member 70. The main body 10 has a cabinet (20, 30) with a display window 21 on its front surface 21a, and a display panel 40 accommodated in the cabinet (20, 30). The stand 50 is located under the main body 10. The supporting member 70 is fixed with the stand 50. The supporting member 70 is a member to support the main body 10 at a position over the stand 50 by fixing a back 40b of the display panel 40. The supporting member 70 has a stand fixation part 81 that is fixed with the stand 50. Further, the supporting member 70 has a back fixation portion 84 to fix the back 40b of the display panel 40 at a position higher than the stand fixation part 81. The supporting member 70 is formed as protruding upward from the stand 50 and shifts a center of gravity of the display panel 40 rearward.

The supporting member 70 which is fixed with the stand 50 is formed to protrude upward from the stand 50 and shift a center of gravity of a display panel 40 rearward. Therefore, the stability of TV 1 which the supporting member 70 supports the main body 10 is improved.

Where the supporting member is protruding upward from the stand, the shape of the supporting member which shift the center of gravity of the display panel rearward includes following shape. Namely, where a fixation portion is shaped at upper portion of the supporting member, the shape to shift front part of the upper portion rearward should be understood to be included.

Figure 18:
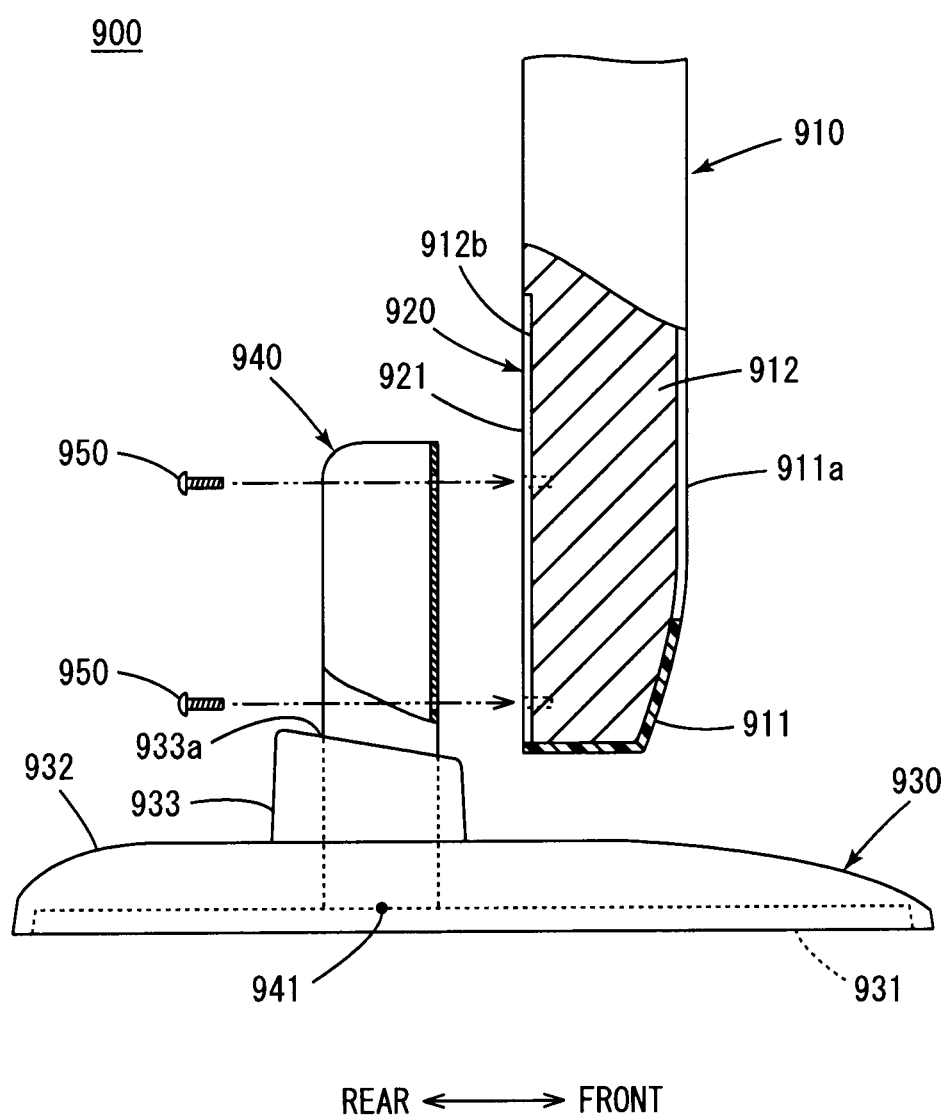
FIG. 18 is an exemplary illustration of a left side view showing a process of assembling the liquid crystal television of a comparative example.

FIG. 18 is a side view schematically showing a liquid crystal television 900 (a flat panel display) as a comparative example. This liquid crystal television 900 comprises a main body 910 of television, a body side bracket 920, a stand 930, and a support bracket 940. The main body 910 comprises a resin cabinet 911 with a display window 911a on its front surface, and a liquid crystal display panel 912 accommodated in the cabinet 911. The body side bracket 920 is formed from a metal sheet by a press molding, and is fixed with the back 912b of the display panel 912 by screws which are not shown in the figure. The stand 930 comprises a metal sole plate 931 and a resin outer 932. The outer 932 has a bracket insertion part 933 which is formed with an opening 933a to insert the support bracket 940. The support bracket 940 is formed from a metal sheet by pressing a metal plate, and molding it, and it is inserted in the bracket insertion part 933, and it is fixed to metal soleplate 931. The support bracket 940 is installed by screw 950 on the back 921 of the body side bracket 920. Therefore, the display panel 912 is fixed with front side of the support bracket 940.

Figure 19:
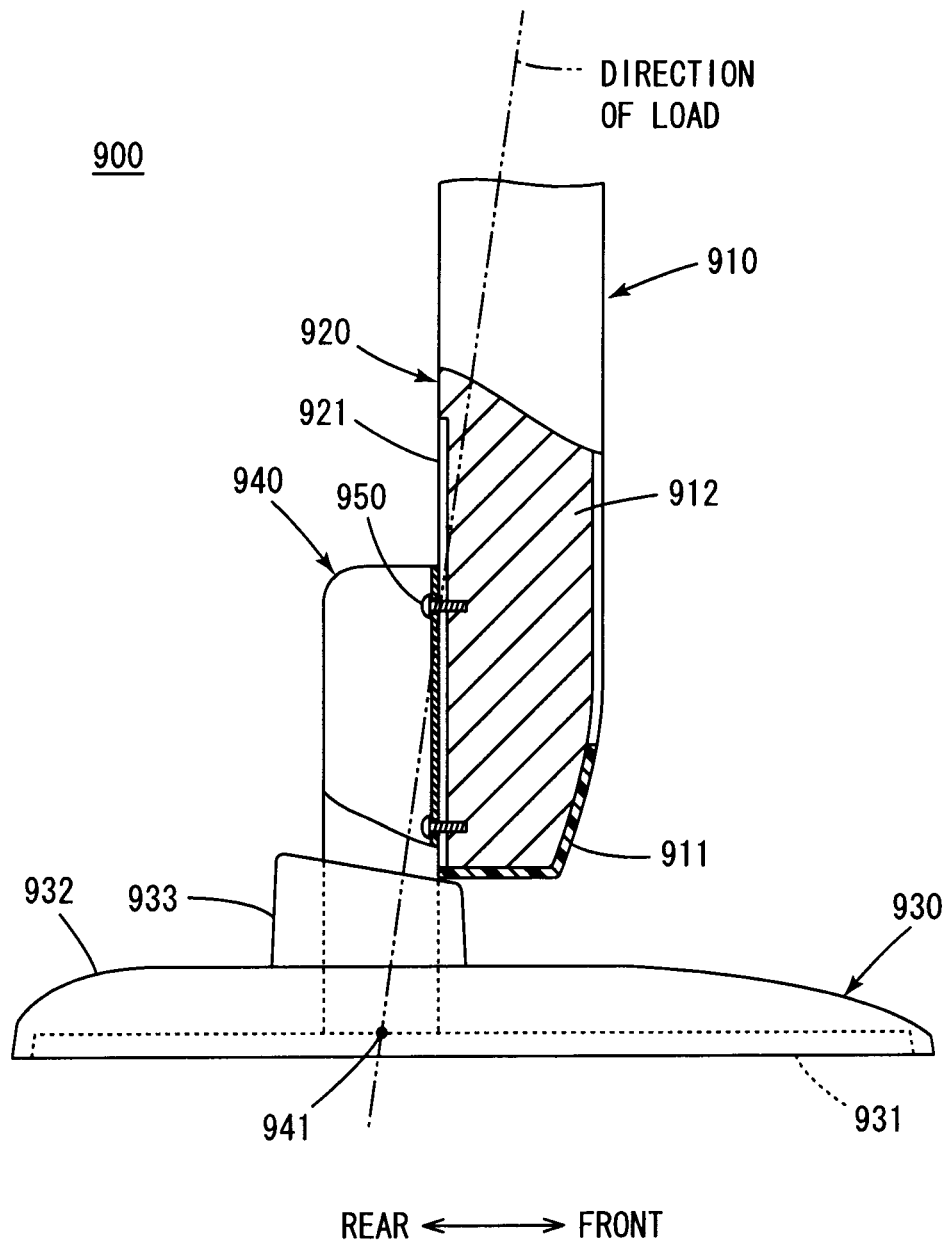
FIG. 19 is an exemplary illustration of a left side view showing an essential part of the liquid crystal television of a comparative example.

FIG. 19 is a side view schematically showing the liquid crystal television 900 which is fixed with brackets 920, 940 as a comparative example. As shown in double-dashed chain line in the figure, there will be a load which leans forwards on a connecting portion 941 of the stand 930 and the support bracket 940.

Figure 3:
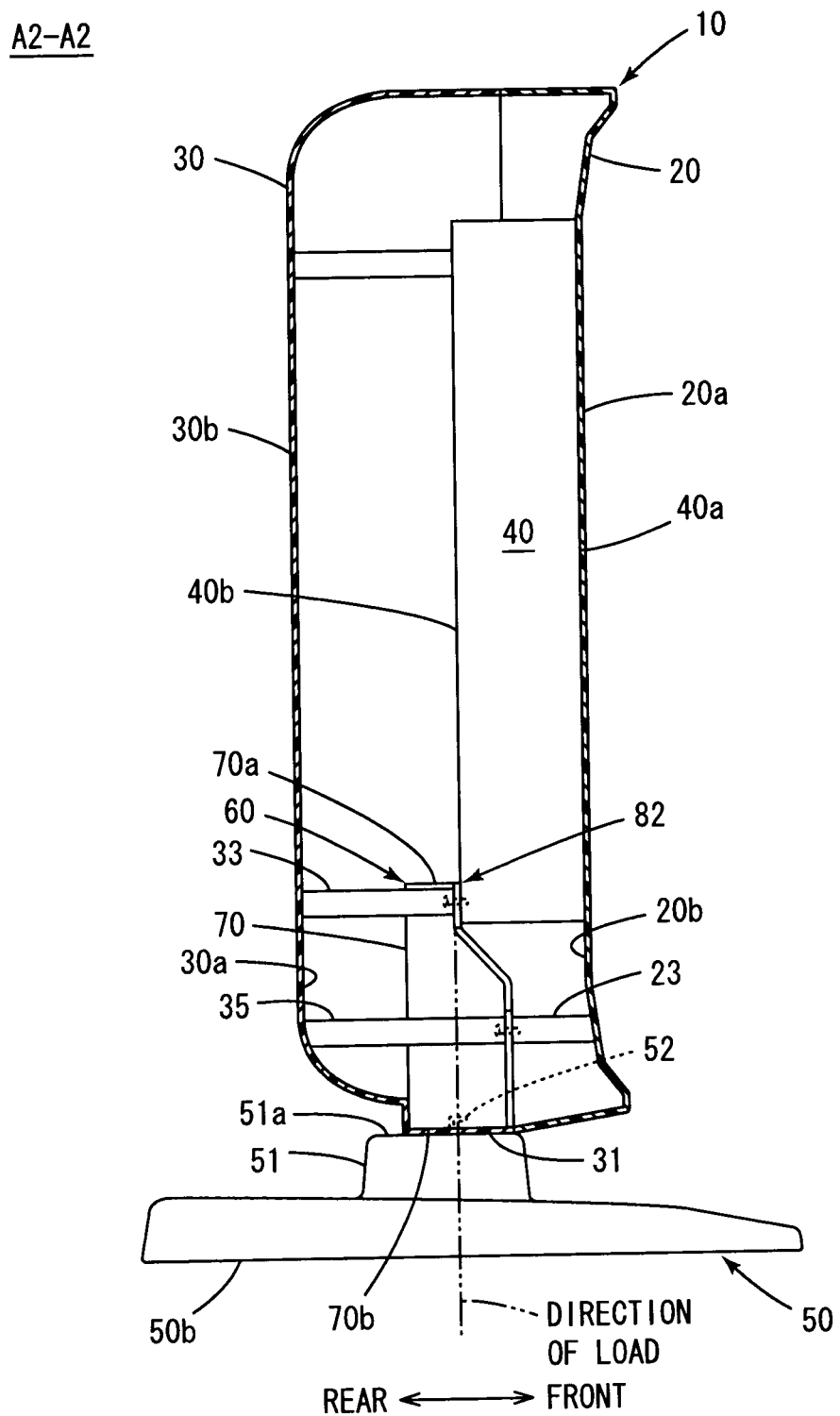
FIG. 3 is an exemplary illustration of a vertical cross section of the flat panel display in FIG. 1 cut at A2-A2 of FIG. 1.
Figure 4:
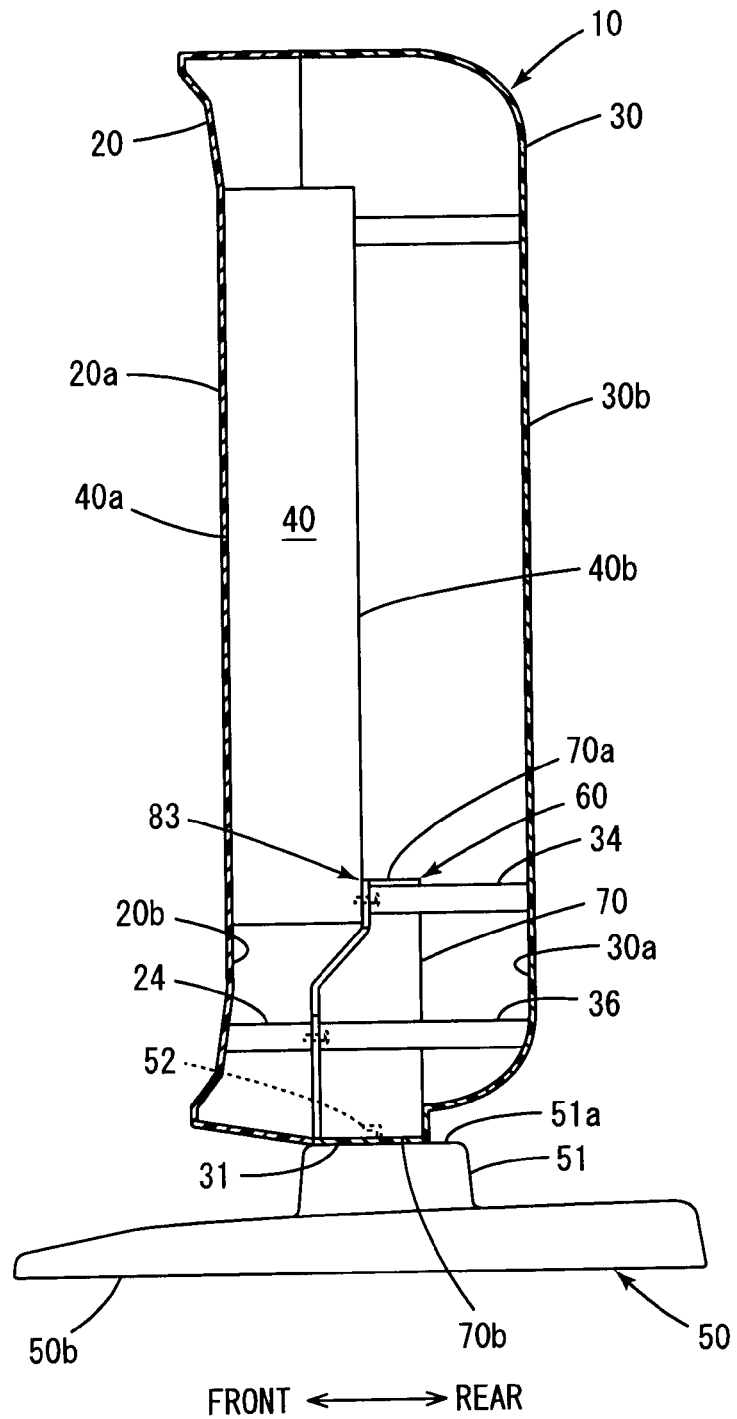
FIG. 4 is an exemplary illustration of a vertical cross section of the flat panel display in FIG. 1 cut at A3-A3 in FIG. 1.
Figure 5:
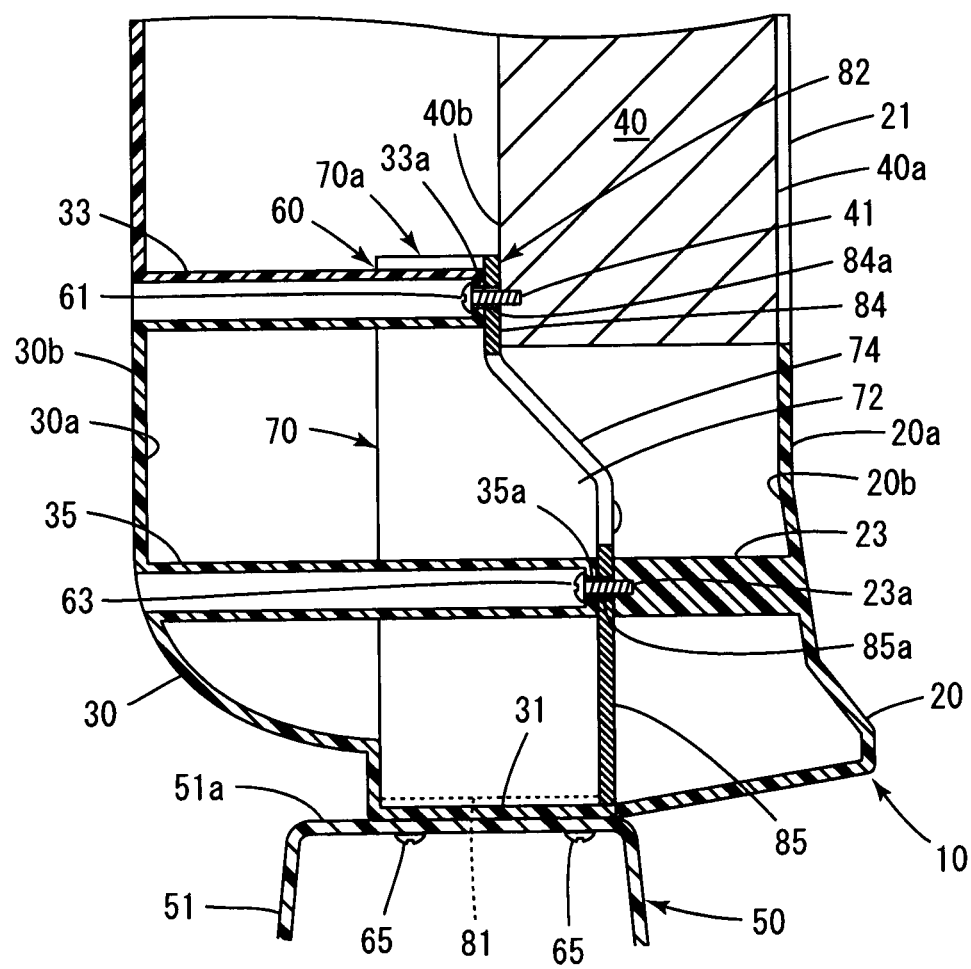
FIG. 5 is an exemplary illustration of a vertical cross section of essential part of the flat panel display cut at A4-A4 in FIG. 1.

On the other hand, FIG. 3 is a vertical cross section of TV 1 cut at A2-A2 in FIG. 1. As shown in double-dashed chain line in FIG. 3, a degree of leaning forward of the load on the connecting portion (a supporting member lower end 70b) of the stand 50 and the supporting member 70 will be less than the degree of leaning forwards shown in FIG. 19. Therefore, the stability of the TV 1 which the supporting member 70 supports the main body 10 has improved.

The supporting member 70 of this embodiment is equipped with evacuating portions 82, 83 at upper portion 70a, and the evacuating portions 82, 83 are formed as front part of the supporting member 70 being evacuated toward rear. Back fixation portions 84 are formed on the evacuating portions 82, 83 respectively. As a result, a center of gravity of the display panel 40 can be shifted rearwards by the simplified formed supporting member 70. Of course, the shape of the supporting member 70 having evacuating portions 82, 83 is an example of the shapes of the supporting member 70 which can shifts the center of gravity of the display panel 40 rearwards.

The stand fixation part 81 of this embodiment is formed at a lower end portion 70b of the supporting member 70. And an opening (81a) is formed on one portions of the stand fixation part stand 50 and top surface 51a of the stand 50. And on another portion (the top surface 51), a latch portion 52 to be inserted in to the opening (81a) is formed. As a result, assembling of the TV 1 becomes easier.

A bottom portion 31 of a cabinet 30 of this embodiment is located between the stand fixation part 81 and a top surface 51a of a stand 50. A second opening 32 is formed on the bottom portion of the cabinet 30. The latch portion 52 is inserted into an opening (81) of said one portion (the stand fixation part 81) and the second opening 32, and is latched to the other portion (the stand fixation part 81). As a result, the stability of the main body 10 improves.

The stand fixation part 81 of this embodiment is equipped with a screw aperture 81b in order to be fixed to the stand 50 by a screw. The stand 50 is equipped with an aperture 53 for fastening which let a screw 65 pass through from the bottom toward a screw aperture 81b when the latch portion 52 is inserted into the opening (81a) of the one portion and is latched to the other portion (the stand fixation part 81). When the latch portion 52 is inserted into the opening (81a) of the one portion and is latched to the other portion (the stand fixation part 81), the screw 65 which is inserted into the aperture 53 for fastening and is screwed with the screw aperture 81b. As a result, the stand fixation part 81 is fixed with the stand 50. As a result, assembling of the TV 1 becomes easier.

The cabinets 20, 30 of this embodiment are equipped with bosses (abutment) 33, 34 which are formed to protrude forward from a position which faces a back fixation portion 84 and turn to abut against said back fixation portion 84. These bosses 33, 34 and the back fixation portion 84 and the back 40b of the display panel 40 are fixed together by the screws. As a result, the stability of the main body 10 improves.

The cabinets 20, 30 of this embodiment is comprised of a front cabinet 20 which is formed to have a display window 21, and a rear cabinet 30 which locates behind the front cabinet 20. The supporting member 70 is equipped with a cabinet fixation portion 85 at a position lower than the display panel 40. The rear cabinet 30 is equipped with second bosses 35, 36 that protrude forward from a position that faces the cabinet fixation portion 85 and abuts to the cabinet fixation portion 85. The front cabinet 20 is equipped with third bosses 23, 24 which protrude rearward from a position which faces the cabinet fixation portion 85 and abuts the cabinet fixation portion 85. The second bosses 35, 36 and the cabinet fixation portion 85 and the third bosses 23, 24 are fixed together by the screws. As a result, the stability of the main body 10 improves.

Figure 14:
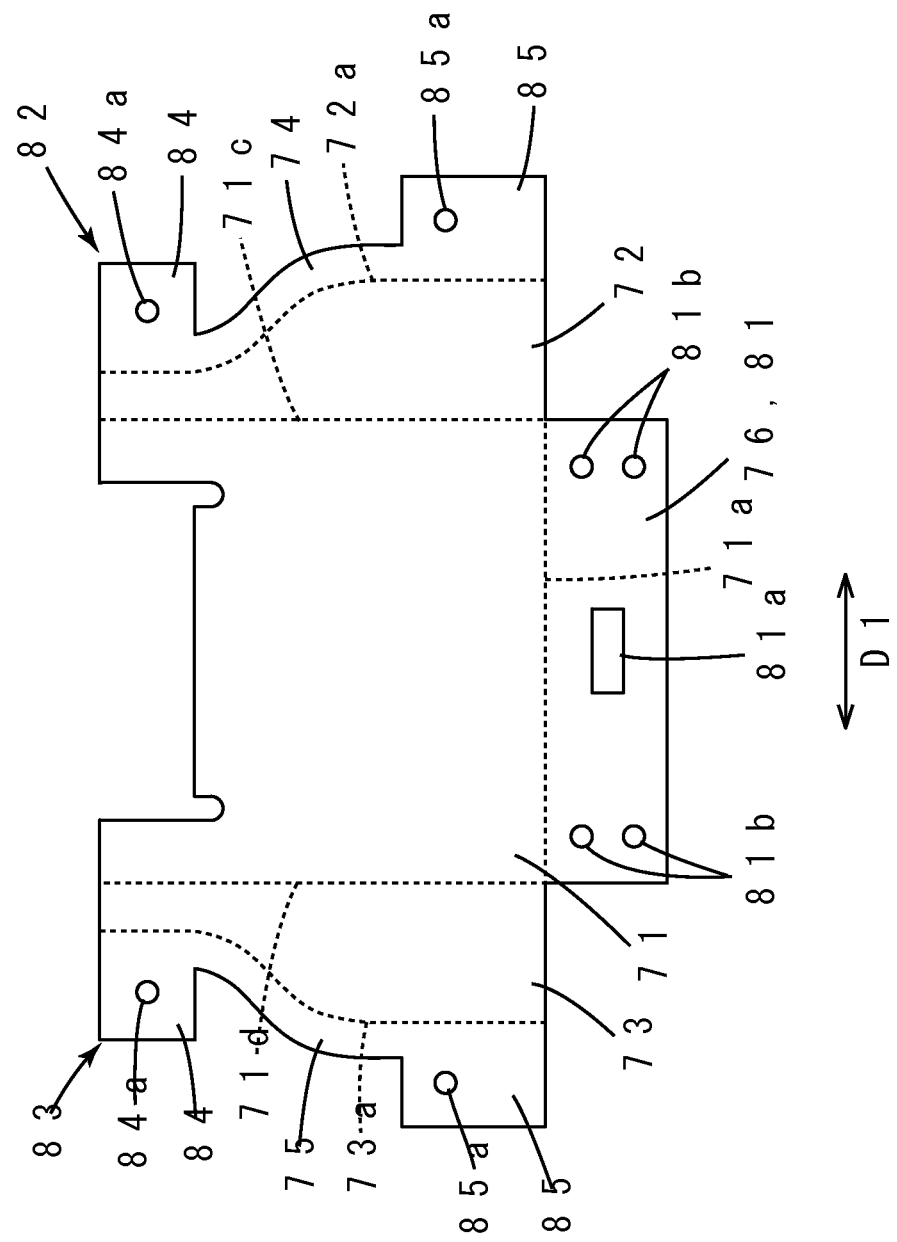
FIG. 14 is an exemplary illustration of a rear view showing a metal plate before being processed.

The supporting member 70 of this embodiment is formed by bending and processing metal plate P1 as shown in FIG. 14. The supporting member 70 comprises a rear extending portion 71 that extends upward from the stand 50, (left side and right side) front extending portions 72, 73 that extends forward from an edge 71c in width direction D1 of the rear extending portion 71, (left side and right side) outer extending portions 74, 75 that extends outer direction from (left and right) edges 72a,73a in width direction of the front extending portions 72,73, and a horizontally extending portion 76 that is set almost horizontally and being aligned with a hemline 71a of the rear extending portion 71. The rear extending portion 71 extends upward from the stand 50. It means the rear extending portion 71 extends upward from the position connecting with the stand 50, and it also means that the rear extending portion 71 extends upward from a place not connecting the stand 50. The stand fixation part 81 is equipped on the horizontally extending portion 76. The outer extending portions 74, 75 are equipped with the back fixation portion 84 on the upper part (70a), and the upper part (70a) is in a shape of evacuating rearward. Therefore, the center of the gravity of the display panel 40 can be shifted rearward by using the supporting member 70 which is easily manufactured.

A plurality of metal plate parts 920, 940 are necessary for TV 900 shown in FIG. 19 as a comparison example in order to connect main body of television 910 with a stand 930. In addition, since the support bracket 940 extends from the stand 930, processes to secure safety such as removing obstructions of the support bracket 940 or covering the support bracket 940 with a resin cover. Furthermore, the load that declined forward is added to stand 930 and joint 941 of support bracket 940. Therefore, during the stability confirmation check, such as inclining or swinging the TV frontward, the TV happens to be unstable. Therefore it was required to make the stand larger or heavier in the comparative example TV 900.

A supporting member 70 is made of metal plate and is connected to a display panel 40 which is a liquid crystal display panel. TV 1 of this embodiment contains the supporting member 70 in the cabinets 20, 30, and the stand 50 is directly connected to the supporting member 70. In other words, the TV 1 omits indirect connection by the support bracket, and has only one position to support the load. Since the stand 50 and the supporting member 70 which is made by a metal sheet are directly connected, the number of metal sheet parts which are necessarily used is decreased. Namely, since the number of parts of TV is decreased, the manufacturing cost is decreased. Further, since extended metal sheet parts are not used for the main body of TV and the stand, processes such as removing obstructions of the metal sheet parts or covering the metal sheet parts with resin covers become needless.

TV 1 of this embodiment provides the following effects.

Primarily, an installing structure of the stand for holding the main body of television can be simplified.

Secondarily, ability for holding the main body of television can be improved.

Thirdly, a stability of TV is improved and a number of TV parts can be reduced.

In addition, from these, TV 1 of this enforcement form can make the stand small and can dispense with processing and the resin cover of the metal plate artifact to secure safety and can reduce production cost of TV.

The details of TV 1 will be explained as follows.

Main body 10 is comprised of cabinets 20, 30 which are shaped as a thin box based on the direction of front to back, a display panel 40 which faces its displaying side frontward and is contained in the cabinets 20, 30, print circuits which performs as a control circuit and is not shown in the figure, a receiver to receive a broadcast signal and an audio output part which outputs audio and is not shown in the figure. And, under the control of the control circuit, by receiving broadcasting signal or inputting signal of predetermined format from auxiliary input terminals, images are displayed on the display surface, and audio is output by the audio output part.

Cabinets 20, 30 are comprised of a front cabinet 20 which is made of resin and is formed to have a display window 21 for the display panel 40 on its front face, and a rear cabinet 30 which is also made of resin and is located behind the front cabinet 20.

Figure 7:
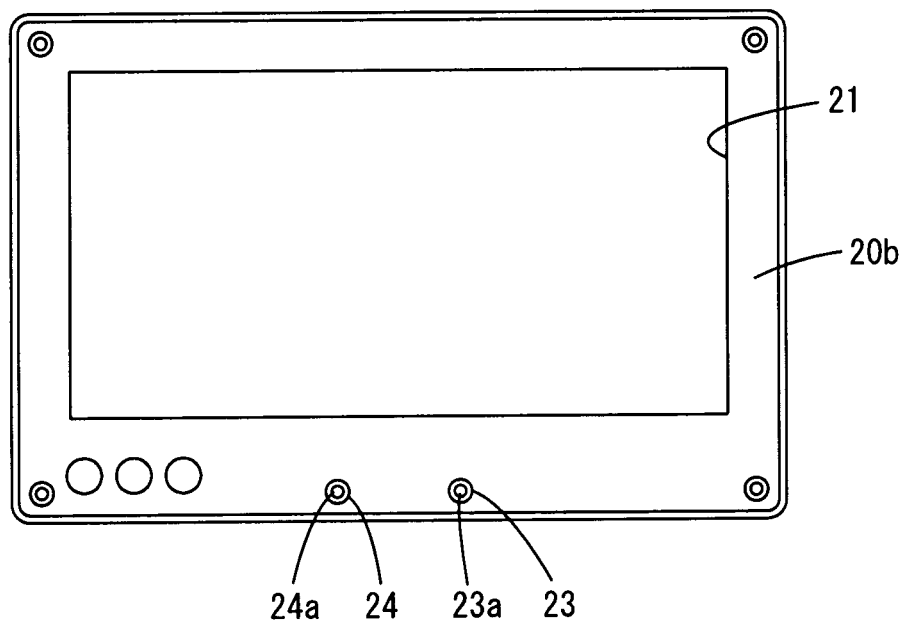
FIG. 7 is an exemplary illustration of a rear view showing a front cabinet.

As shown in FIG. 7 and other figures, the front cabinet 20 is equipped with a third left side boss 23 and a third right side boss 24 which are protruding rearward from inside surface 20b which is back side of a front surface 20a. For example, the front cabinet 20 is formed to be the shape of having a plurality of bosses 23, 24 by injection molding of resin such as thermoplastic resin. The third bosses 23, 24 are formed almost as a pillar shape and protrudes rearward from a position which faces the cabinet fixation portion 85 of the supporting member 70 and abuts said cabinet fixation portion 85. Of course, the shape of the bosses 23, 24 can be hollow such as almost a cylinder shape or a square pillar shape. Screw apertures 23a, 24a are equipped at the tip surface of the third bosses 23, 24 in order to fix the cabinets 20, 30 and the supporting member 70 together with screws.

Figure 8:
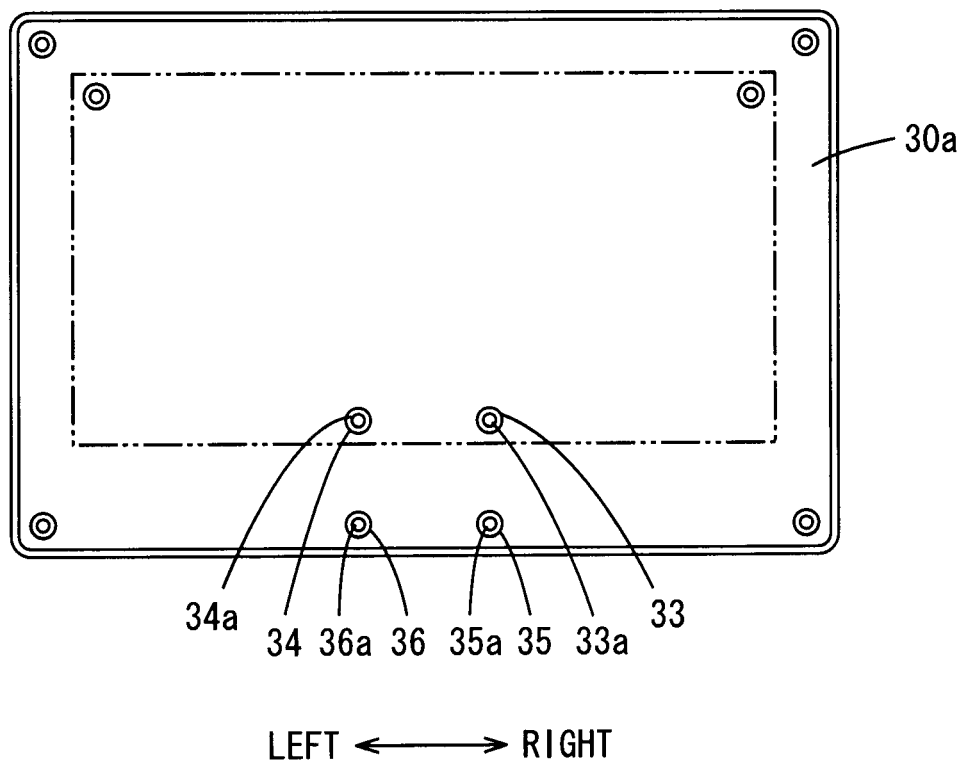
FIG. 8 is an exemplary illustration of a front view showing a rear cabinet.

As shown in FIG. 8, a rear cabinet 30 is equipped a first left side boss 33, a first right side boss 34, a second left side boss 35 and a second right side boss 36 which are protruding forward from inside surface 30a which is back side of a back surface 30b. For example, the rear cabinet 30 is formed to be the shape of having a plurality of bosses by injection molding of resin such as thermoplastic resin. The second bosses 33, 34 are formed almost as a pillar shape in order to receive the screws 61, 62 and protrudes forward from a position which faces the back fixation portion 84 of the supporting member 70 and abuts said back fixation portion 84. The second bosses 35, 36 are formed almost as a pillar shape in order to receive the screws 63, 64 and protrudes forward from a position which faces the cabinet fixation portion 85 of the supporting member 70 and abuts said cabinet fixation portion 85. Of course, the shape of bosses 33-36 can be hollow such as almost a square pillar shape as an external shape. Screw apertures 34a, 35a, 36a are formed at the tip surface of the bosses 33,34,35,36 for fixing together with screws.

Figure 6:
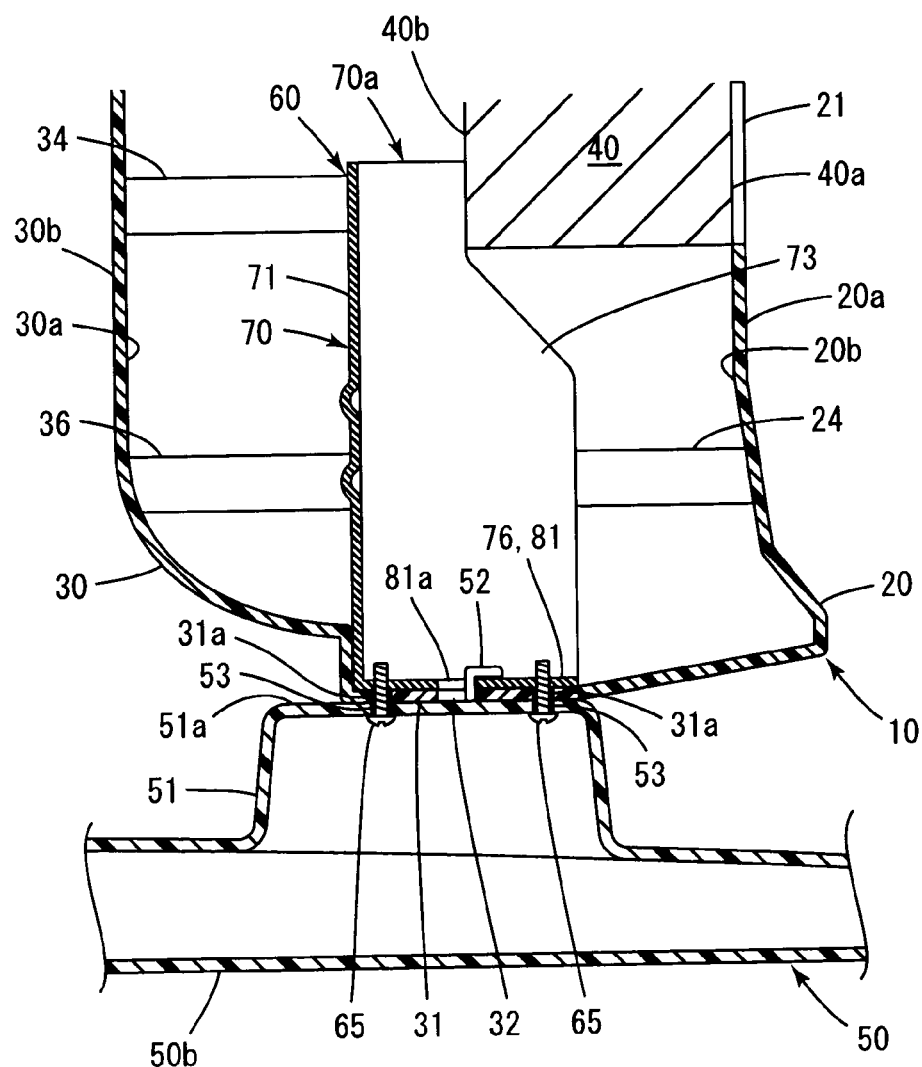
FIG. 6 is an exemplary illustration of a vertical section of essential part of the flat panel display cut at A5-A5 in FIG. 1.

In addition, as shown in FIG. 6, a bottom portion 31 of the rear cabinet 30 is put between the stand fixation part 81 of the supporting member 70 and a top surface 51a of the stand 50. A second opening 32 is formed on the bottom portion 31 of the rear cabinet 30 at the position corresponding to the first opening 81a of the supporting member 70 in order to pass through the hook portion (latch portion) 52 of the stand 50. Further, a plurality of apertures 31a for fastening are equipped on the bottom portion 31 of the rear cabinet 30 corresponding to the metal plate screw apertures 81b of the supporting member 70.

Figure 10:
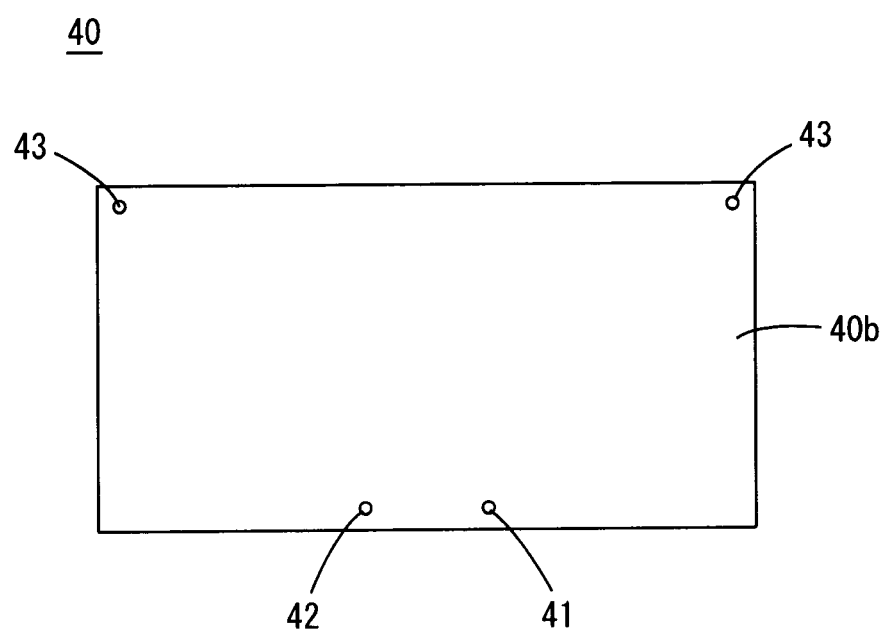
FIG. 10 is an exemplary illustration of a rear view showing a display panel.

As show in FIG. 10, the display panel 40 has its display face 40a in the front side and is equipped with panel screw apertures 41, 42, 43 on a back surface 40b. The left side panel screw aperture 41 and the right side panel screw aperture 42 are fixed with the supporting member 70 by screwing.

Figure 11:
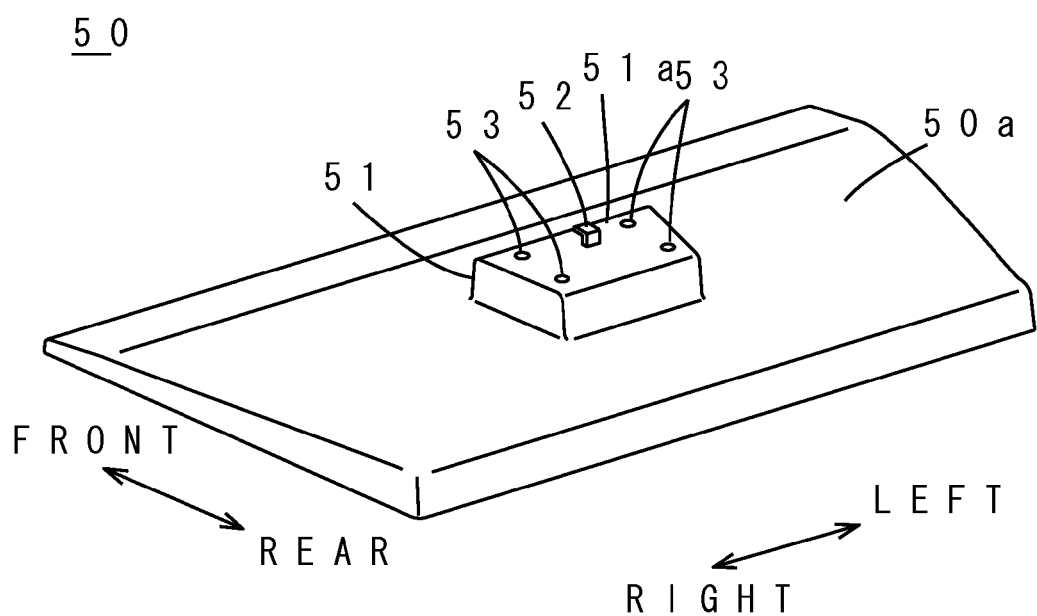
FIG. 11 is an exemplary illustration of a perspective view showing a stand.
Figure 12:
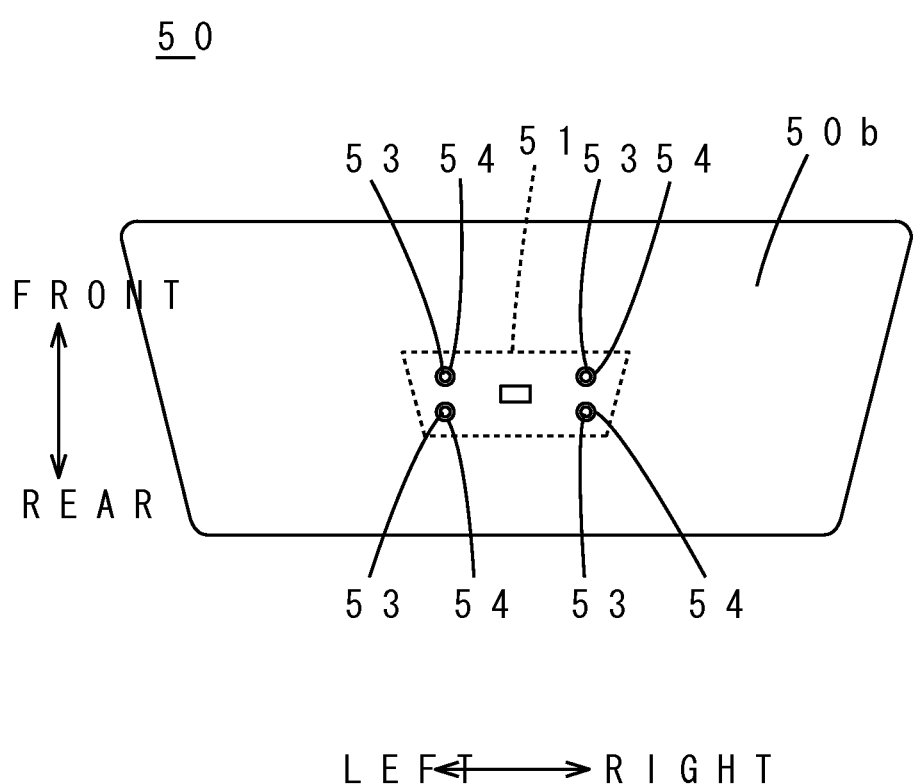
FIG. 12 is an exemplary illustration of a bottom plan view showing the stand.

As shown in FIG. 11 and other figures, the stand 50 which locates under the main body 10 is equipped with a salient 51. The salient protrude from center portion of a top surface 50a which is a general portion. Further the stand 50 is equipped with reinforcement ribs inside which are not shown in the figures. A hook portion 52 and a plurality of apertures 53 for fastening are equipped on the salient 51. A hook portion 52 is formed to be a shape which protrudes upward from the top surface of the salient 51a and then protrudes forward. And the hook portion 52 is formed to latch with the horizontally extending portion 76 of the supporting member 70 after being inserted into the opening 32 of the rear cabinet 30 and the opening 81a of the supporting member 70. Apertures 53 for fastening have screws 65 passes through upward from the bottom to the metal plate screw aperture 81b when the hook portion 52 is inserted through the opening 32, 81a and latched to the horizontally extending portion 76. As shown in FIG. 12, screwdriver apertures 54 are formed on the bottom surface 50b of the stand 50 in order to have the screws 65 pass through to the screw apertures 53.

The stand 50 is, for example, formed by fitting main body which is equipped with the salient and bottom member together. For example, these main body and bottom member are formed by injection molding of resin such as thermoplastic resin.

A support means 60 is equipped with the supporting member 70 and screws 61-65. The support means 60 is fixed to the stand 50 and supports the main body 10 by fix a back surface 40b of the display panel 40 at a position over the stand 50.

Figure 13:
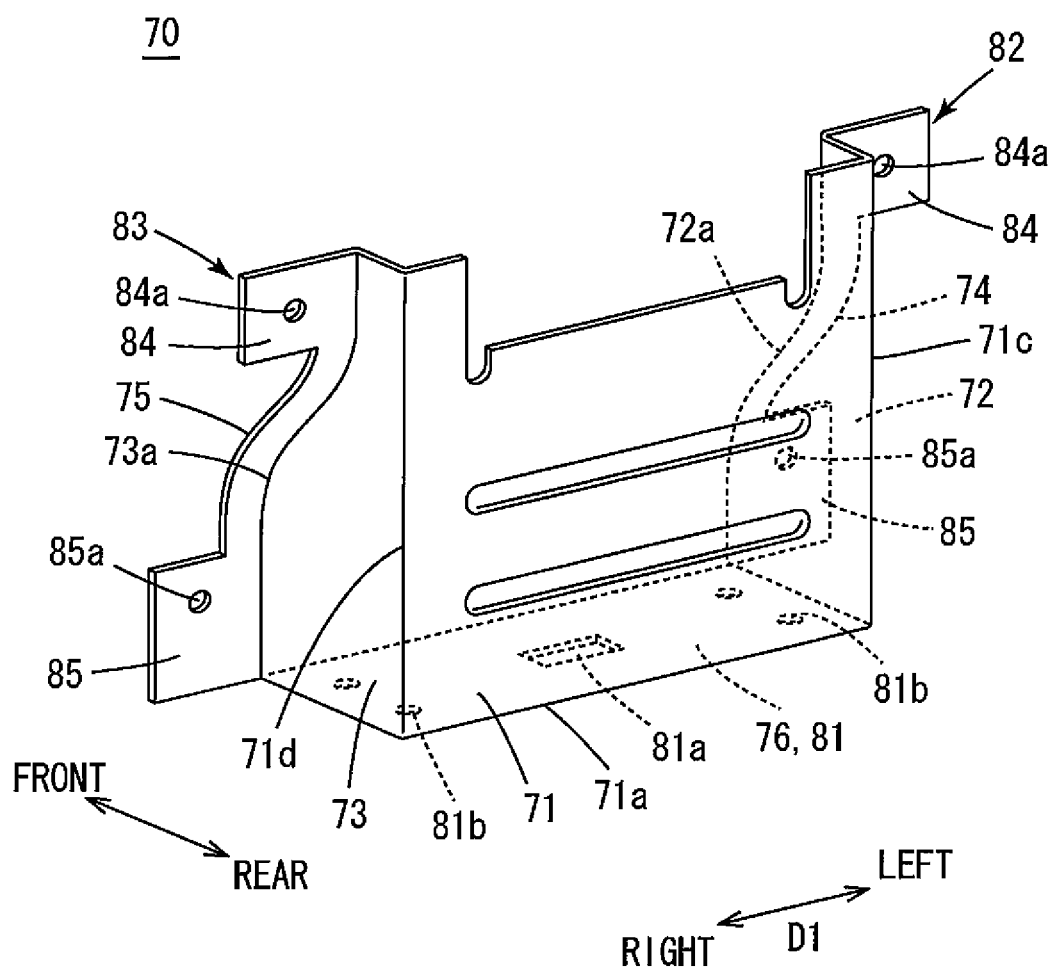
FIG. 13 is an exemplary illustration of a perspective view showing a supporting member.

As shown in FIG. 13 and other figures, the supporting member 70 is made of metal plate and formed to have a rear extending portion (a back wall) 71, a left side front extending portion (a left side wall) 72, a right side front extending portion (a right side wall) 73, a left side outer extending portion (a left side flange) 74, a right side outer extending portion (a right side flange) 75 and a horizontally extending portion (a bottom wall) 76.

The rear extending portion 71 protrudes upward from the stand 50. The left side front extending portion 72 protrudes forward from a left edge 71c of the rear extending portion 71 in view of being observed from front side. The right side front extending portion 73 protrudes forward from a right edge 71d of the rear extending portion 71 in view of being observed from front side. The left side outer extending portion 74 is equipped with a left side evacuating portion 82 which protrudes leftward from a front edge 72a of the left side front extending portion 72 and evacuates rearward at the upper portion (70a). An aperture 84a for fastening is formed on the left side evacuation portion 82. An aperture 85a for fastening is formed at lower portion of the left side evacuating portion 82 of the left side outer extending portion 74. The right side outer extending portion 74 is equipped with a right side evacuating portion 83 which protrudes rightward from a front edge 73a of the right side front extending portion 73 and evacuates rearward at the upper portion (70a). An aperture 84a for fastening is formed on the right side evacuating portion 83. An aperture 85a for fastening is formed at lower portion of the right side evacuating portion 83 of the right side outer extending portion 75. A horizontally extending portion 76 protrudes forward from hemline 71a of the rear extending portion 71, and is equipped with a first opening 81a at almost center position. Further, a plurality of metal sheet screw apertures 81b are formed at positions corresponding to the respective aperture 53 for fastening of the stand 50. As a result, the horizontally extending portion 76 is set almost horizontally being aligned with hemline 71a of the rear extending portion 71. Of course, the horizontally extending portion 76 can be a portion of extending rightward from hemline of the left side front extending portion 72, or a portion of extending leftward from hemline of the right side front extending portion 73, or a portion of extending to a direction being closer respectively from the hemline of both front extending portions 72, 73.

The supporting member 70 can be formed by press molding (bending process) of a metal plate P1 show in FIG. 14. Same reference numbers which corresponds to each part of the supporting member 70 are assigned at the same position on a metal plate before being processed P1, the supporting member 70.

The supporting member 70 is comprised of the stand fixation part 81, a left side evacuating portion 82, a right side evacuating portion 83 and a cabinet fixation portion 85. The stand fixation part 81 which will be fixed to the stand 50 is formed on the horizontally extending portion 64 which is a lower end portion 70b of the supporting member 70. Evacuating portions 82, 83 are formed in a shape which the front side of the upper portion 70a evacuates rearward, and are equipped with the back fixation portions 84, 84 for fixing the back 40b of the liquid crystal display panel 40 at a position higher than the stand fixation portion 81. These back fixation portions 84, 84 are portions having screw apertures 84a, 84a in the evacuating portions 82, 83. The cabinet fixation portions 85, 85 are at a position lower than the liquid crystal display panel 40, and are portions having apertures 85a, 85a for fastening in the outer extending portions 74, 75. The back fixation portion 84, 84 (the evacuating portions 82, 83) are formed on the upper part 70a which extends upward from the stand 50. Therefore, the supporting member 70 is in a shape of protruding upward from the stand 50 and then shifts a center of gravity of the display panel 40 rearward.

(2) The Assembling Method of the Flat Panel Display, its Operation and an Effect The assembling method of TV 1 will be explained as follows.

Figure 15:
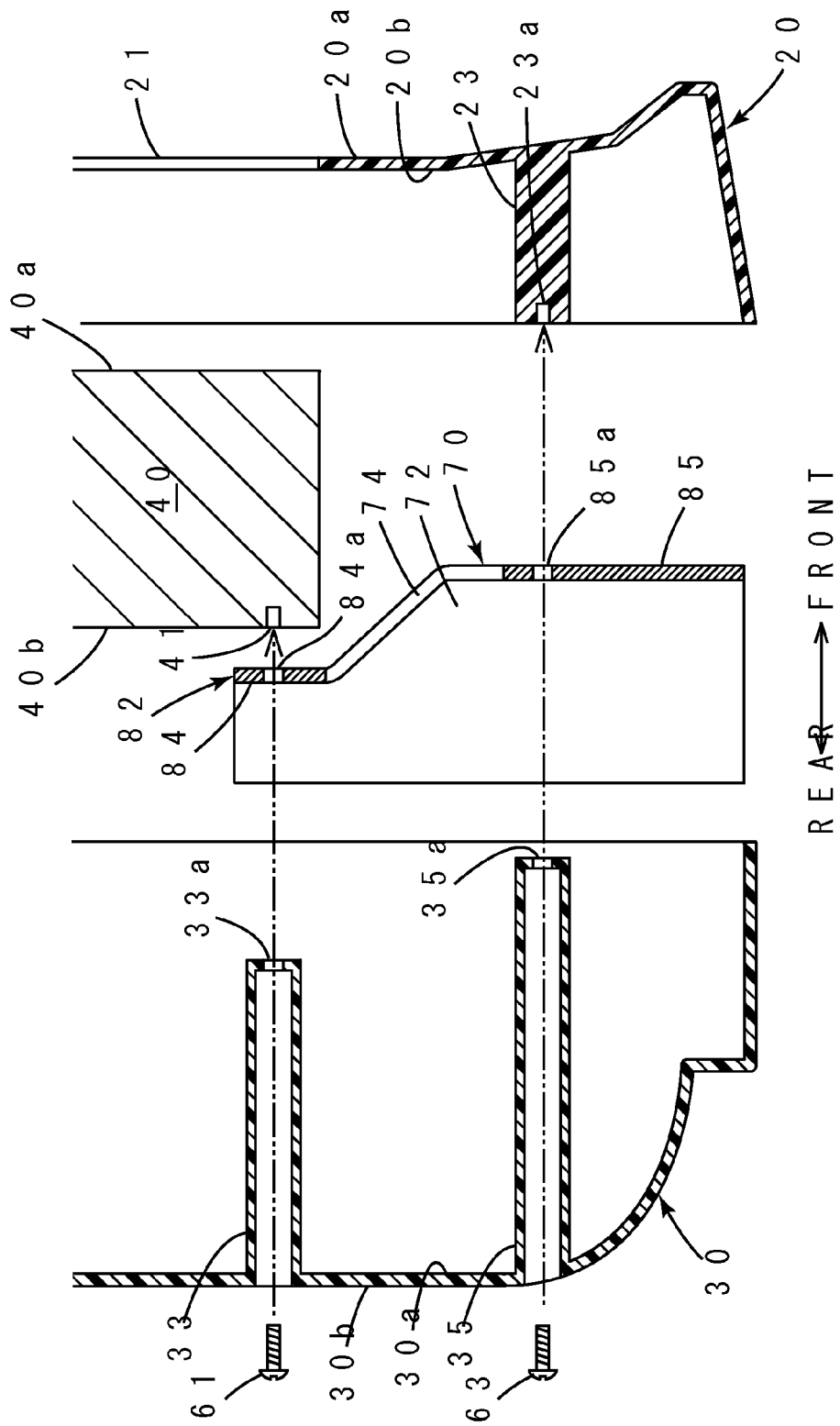
FIG. 15 is an exemplary illustration of an exploded view showing a process of assembling the main body of the flat panel display cut at A2-A2 in FIG. 1.
Figure 16:
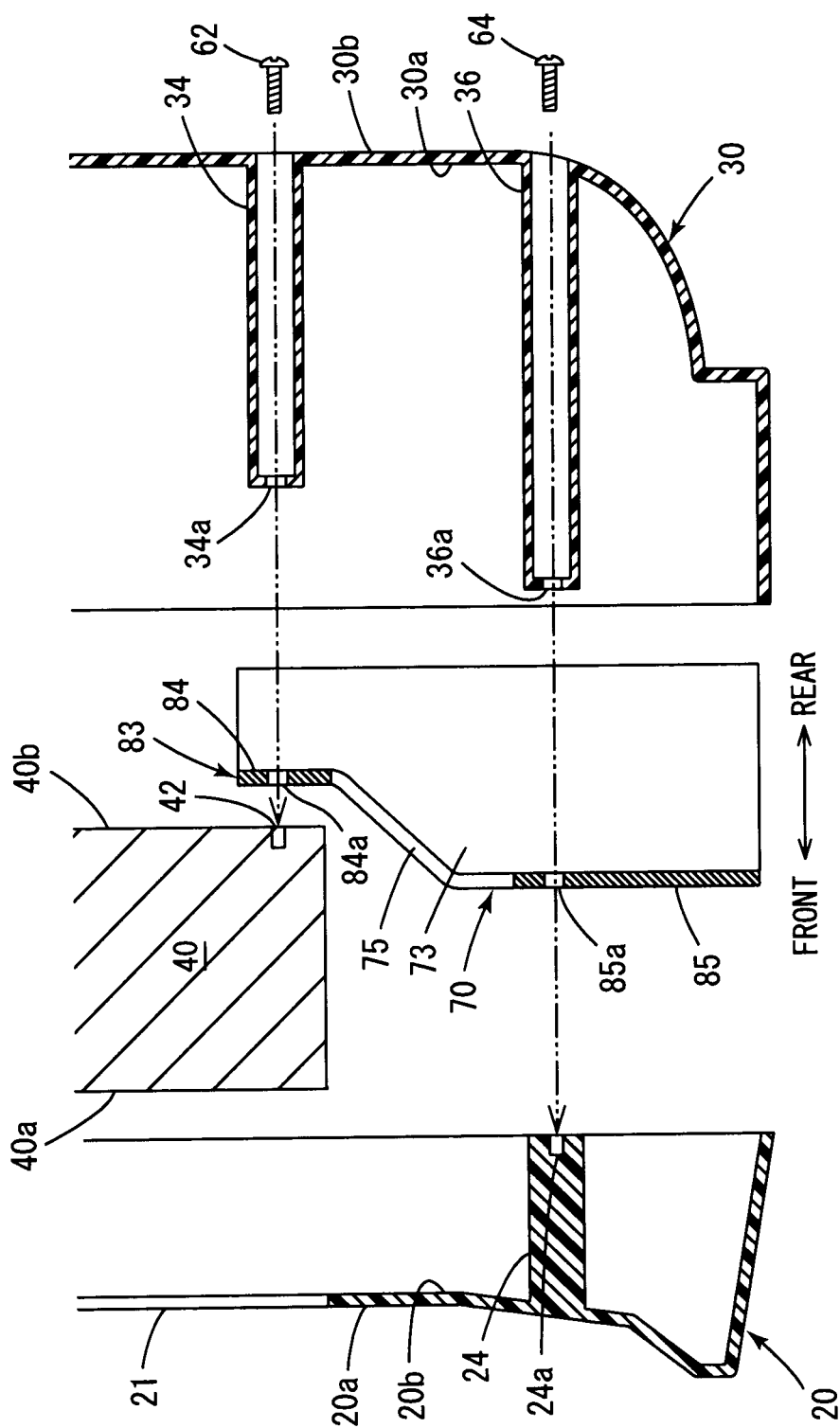
FIG. 16 is an exemplary illustration of an exploded view showing a process of assembling the main body of the flat panel display cut at A3-A3 in FIG. 1.
Figure 17:
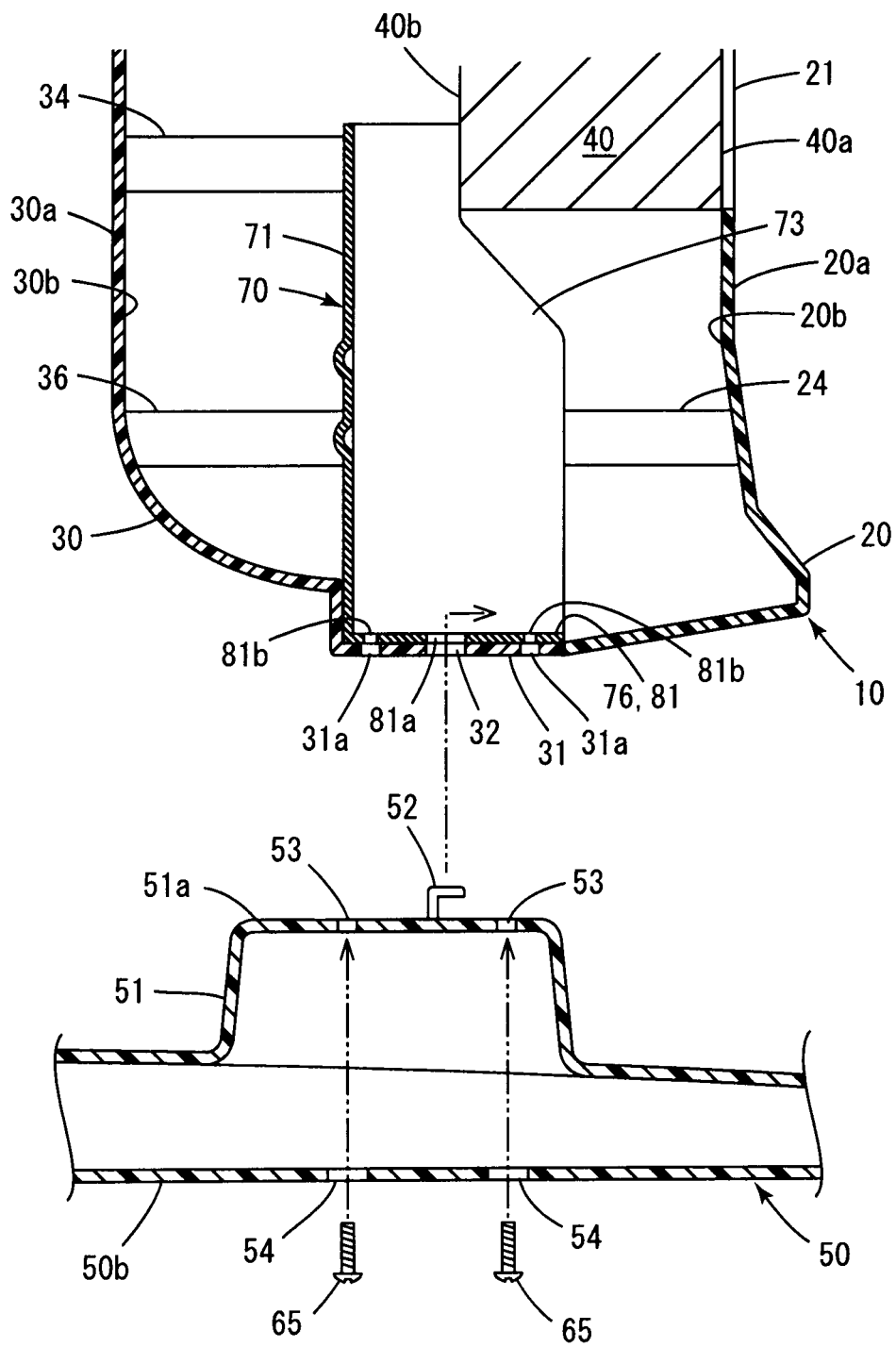
FIG. 17 is an exemplary illustration of an exploded view showing a process of assembling the flat panel display cut at A5-A5 in FIG. 1.

At first, as shown in FIG. 15 and FIG. 16, cabinets 20, 30, (liquid crystal) display panel 40 and supporting member 70 are fixed with each other by screws 61-64, thus a main body 10 is built. The supporting member 70 is allocated as follows. The display panel 40 is allocated at a position of display window 21 of the front cabinet 20, the apertures 84a, 84a for fastening are allocated with the screw apertures 41, 42 of the display panel 40, then the apertures 85a, 85a for fastening are allocated with the screw apertures 23a, 24a of the third bosses 23, 24. Further, the cabinet 30 is allocated as follows. The apertures 34a, 35a for fastening are allocated with the screw apertures 84a, 84a of the supporting member 70, and the apertures 35a, 36a for fastening of the second bosses 35, 36 are allocated with the screw apertures 85a, 85a of the supporting member 70. Then, the screw 61 shown in FIG. 15 is inserted into the aperture 33a for fastening of the first left side boss 33 and the aperture 84a for fastening of the left side evacuating portion 82, and screwed with the left side panel screw aperture 41. And the screw 62 shown in FIG. 16 is inserted into the aperture 34a for fastening of the first right side boss 34 and the aperture 84a for fastening of the right side evacuating portion 83, and screwed with the right side panel screw aperture 42. As a result, the second bosses 33, 34 and the evacuating portions 82, 83 and the liquid crystal display panel 40 are fixed together with screws, and the stability of the main body 10 improves. Further, the screw 63 shown in FIG. 15 is inserted into the aperture 35a for fastening of the second left side boss 35 and the aperture 85a for fastening of the left side outer extending portion 74, and screwed with the screw aperture 23a of the third left side boss 23. And the screw 64 shown in FIG. 16 is inserted into the aperture 36a for fastening of the second right side boss 36 and the aperture 85a for fastening of the left side outer extending portion 75, and screwed with the screw aperture 24a of the third right side boss 24. As a result, the second bosses 23,34 and the outer extending portions 74, 75 and the third posses 35, 36 bosses are fixed together with screws, and the stability of the main body 10 improves.

Figure 9:
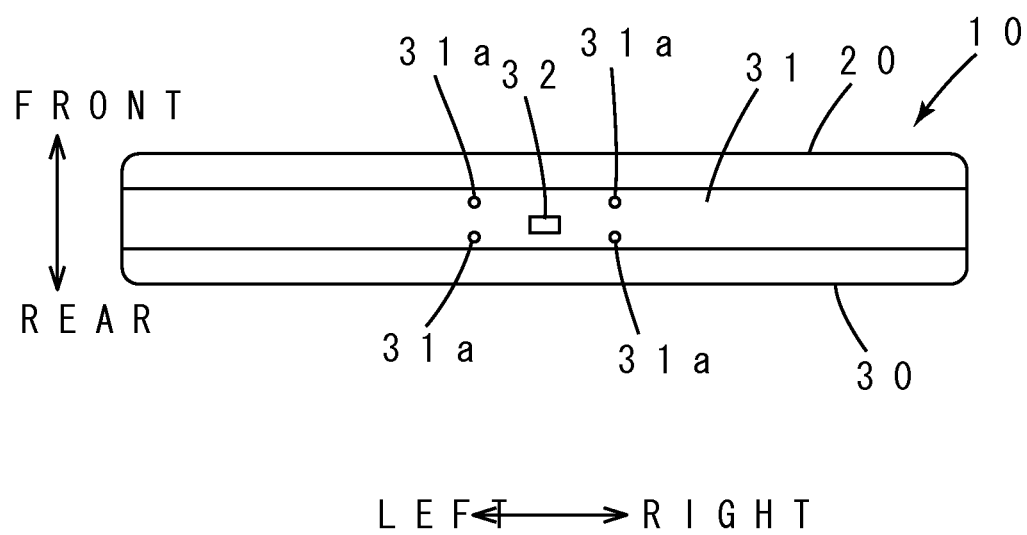
FIG. 9 is an exemplary illustration of a bottom view showing a main body of the flat panel display.

The Main body 10 which is installed with the supporting member 70 is in a condition where a second opening 32 of the cabinet and a plurality of aperture 31a for fastening can be seen from outside as shown in FIG. 9 which is a bottom plan view. The second opening 32 leads to the first opening 81a of the lower end portion 70b of the supporting member 70. Each aperture 31a for fastening leads to each metal plate screw apertures 81b of the lower end portion 70b of the supporting member 70. Therefore, at first, the hook portion 52 of the stand 50 is inserted into the opening 32, 81a, and have the horizontally extending portion 65 of the supporting member 70, thus the stand 50 is temporary positioned to the main body 10. Since the main body 10 of the television can be positioned against the stand 50 in this way, assembling of TV is easy. Then the screws 65 are inserted from bottom to the apertures 54 for fastening of the stand 50 and the apertures 31a for fastening of the cabinet 20, 30, and screwed with the metal plate screw apertures 81b of lower end portion 70b of the supporting member 70. The main body 10 and the stand 50 can be laid down at this time. As explained above, a horizontally extending portion 76 of the supporting member 70 is fixed with the stand 50 while a bottom portion 31 of cabinet is put between the horizontally extending portion 76 of the supporting member 70 and the top surface 50a of the stand 50. Therefore, the stability of the main body 10 improves.

As of the assembled TV 1, as shown in double-dashed chain line in FIG. 3, a degree of forward inclination of a load of connecting portion, which is a lower end portion 70b, of the stand 50 and the supporting member 70 is less the one of a load shown in FIG. 19. Therefore, according to this invention, I can offer the thin display unit which improved of the stability.

In addition, above mentioned embodiment can be explained in the following manner.

The flat panel display 1 is comprised of the main body 10, the stand 50 and the support means 60. The main body 10 is comprised of a cabinet (20, 30) formed with a display window 21 at the front surface, and the display panel 40 contained in the cabinet (20, 30). The stand 50 is allocated under the main body 10. The support means 60 being fixed with the stand 50 supports the main body 10 by fixing the back 40b of the display panel 40 at a position higher than the stand 50.

Said support means 60 is equipped with the stand fixation part 81 which is fixed with said stand 50.

Said support means 60 is equipped with the back fixation portion 84 to fix the back surface of the display panel 40 at a position which is higher than the position of the stand fixation part 81.

Said support means 60 is formed to be the shape where it extends upward from the stand 50 and shifts the center of gravity of the display panel 40 rearward.

Said cabinet (20, 30) is comprised of a front cabinet 20 made of resin and formed to have the display window 21 and a rear cabinet 30 which is made of resin and located behind the front cabinet 20.

Said display panel 40 is a liquid crystal display panel 40 which is equipped with a left side panel screw aperture 41 and a right side panel screw aperture 42 which are to be screwed with the supporting member 70.

Said supporting member 70 is formed by bending the metal place P1.

The supporting member 70 is equipped with the rear extending portion 71 which extends upward from the stand 50.

Said supporting member 70 is equipped with the left side front extending portion 72 which extends frontward, in view of being observed from front side, from a left edge 71c of the rear extending portion 71.

Said supporting member 70 is equipped with the right side front extending portion 73 which extends frontward, in view of being observed from front side, from a right edge 71d of the rear extending portion 71.

Said supporting member 70 is equipped with a left side outer extending portion 74 which extends toward left from a front edge 72a of the left side front extending portion 72.

Said supporting member 70 is equipped with a right side front extending portion 73 which extends toward right from front edge 73a of the right side outer extending portion 75.

Said supporting member 70 is equipped with a horizontally extending portion 76 which is set horizontally and aligned with a hemline 71a of the rear extending portion 71.

Said stand fixation part 81 is formed on the horizontally extending portion 76.

Said left side outer extending portion 74 is equipped with a left side evacuating portion 82 which is formed to be a shape of being evacuated rearward at a position of upper part (70a).

Said right side outer extending portion 75 is equipped with a right side evacuating portion 83 which is formed to be a shape of being evacuated rearward at a position of upper part (70a).

Said left side evacuating portion 82 and said right side evacuating portion 83 are equipped with fixation portions 84, 84.

First and second apertures 84a, 84a for fastening are formed on each of said fixation portions 84, 84 in order to let screws 61, 62 pass through the fixation portions 84, 84 toward the panel screw apertures 41, 42 from rear side.

Third and forth apertures 85a, 85a for fastening are formed on the left side extending portion 74 and the right side outer extending portion 75 at a position of lower position than the display panel 40.

Said rear cabinet 30 is equipped with the first left side boss 33 which protrudes frontward from a position which faces the left side evacuating portion 82 and abuts to the back fixation portion 84.

Said rear cabinet 30 is equipped with the first right side boss 34 which protrudes forward from a position which faces the right side evacuating portion 83 and abuts to the back fixation portion 84.

Said rear cabinet 30 is equipped with the second left side boss 35 which protrudes frontward from a position which faces the left side outer extending portion 74 at a position which is lower than the position of the first left boss 33 and abuts to the left side outer extending portion 74.

Said rear cabinet 30 is equipped with the second right side boss 36 which protrudes forward from a position which faces the right side outer extending portion 75 at a position which is lower than the position of the first right side boss 34 and abuts to the right side outer extending portion 75.

A fifth aperture 33a for fastening formed on the first left side boss 33 in order to let a screw 61 pass through the first left side boss 33 to the panel screw aperture 41 from rear.

A sixth aperture 33b for fastening formed on the first right side boss 34 in order to let a screw 62 pass through the first right side boss 34 to the panel screw aperture 42 from rear.

A seventh aperture for fastening is formed on the second left boss 35 in order to let a screw 63 pass through the second left side boss 35 to the third aperture 85a for fastening of the left side outer extending portion 74 from rear.

An eighth aperture for fastening is formed on the second right side boss 36 in order to let the screw 64 pass through the second right side boss 36 to the aperture 85a for fastening of the right side outer extending portion 75 from rear.

Said front cabinet 20 is equipped with the third left boss 23 which protrudes rearward at a position facing the second left boss 35 and abuts to the left side outer extending portion 74.

Said front cabinet 20 is equipped with the third right side boss 24 which protrudes rearward at a position facing the second right side boss 36 and abuts to the right side outer extending portion 75.

A first opening 81a is formed on the horizontally extending portion 76.

The bottom portion 31 of the cabinet 30 is located at a position between the horizontally extending portion 76 and the top surface 51a of the stand 50.

The second opening 32 is formed on the bottom portion 31 of the cabinet 30.

A hook portion (a latch portion) 52 is formed on the top surface 51a of the stand 50 in order to be inserted into the second opening 32 and the first opening 81a and to be latched to the horizontally extending portion 76.

A screw aperture 81b which will be fixed with the stand by a screw is formed on the horizontally extending portion 76.

A ninth aperture 31a for fastening is formed on the bottom portion 31 of the cabinet 30 in order to let a screw 65 pass through upward to the metal plate screw aperture 81b.

A tenth aperture 53 for fastening is formed on the stand 50.

The hook portion 52 is inserted through the second opening 32 and the first opening 81a and finally latched to the horizontally extending portion 76. Then, the aperture 53 for fastening lets the screw 65 pass through upward to the screw aperture 81b.

The screw 61 passes through the fifth aperture 33a for fastening of the first left side boss 33 and the first aperture 84a for fastening of the left evacuating portion 82, and the screw 61 screws into the panel screw aperture 41. As a result, the first left boss 33 and the left side evacuating portion 82 and the liquid crystal display panel 40 are fixed together by the screw 61.

The screw 62 passes through the sixth aperture 34a for fastening of the first right side boss 34 and the second aperture 84a for fastening of the right side evacuating portion 83, and the screw 62 screws into the panel screw aperture 42. As a result, the first right side boss 34 and the right side evacuating portion 83 and the liquid crystal display panel 40 are fixed together by the screw 62.

The screw 63 passes through the seventh aperture 35a for fastening of the second left side boss 35 and the third aperture 85a for fastening of the left side outer extending portion 74, and the screw 63 screws into the third left side boss 23. As a result, the second left boss 35 and the left outer extending portion 74 and the left boss 23 are fixed together by the screw 63.

The screw 64 passes through the eighth aperture 36a for fastening of the second right side boss 36 and the forth aperture 85a for fastening of the right side outer extending portion 75, and the screw 64 screws into the third right side boss 24. As a result, the second right side boss 36 and the right side outer extending portion 75 and the third right side boss 24 are fixed together by the screw 64.

The hook portion 52 is inserted through the second opening 32 and the first opening 81a and finally latched to the horizontally extending portion 76. Then the screw 65 passes upward through the tenth aperture 53 for fastening of the stand 50 and the ninth aperture 31a for fastening of the bottom portion 31 of the cabinet 30, and the screw 65 screws into the screw aperture 81b. As a result, the horizontally extending portion 76 is fixed with the stand 50.

(3) Other Embodiments

Various embodiments are considered to be one of embodiments of this invention.

Said flat panel display includes a plasma television, a television which is equipped with a playback and recording device in a unit and another displays. Such playback and recording device includes a hard disk playback and recording device, DVD (Digital Versatile Disk) playback and recording device, and VCR and other devices.

In substitution for said hook portion 52, the lower end portion 70b of the supporting member 70 can be equipped with a hook portion. For example, an opening can be formed on the top surface 51 (one portion) of the stand 50, and a hook portion can be formed on the horizontally extending portion 76 (the other portion) of the supporting member 70 which will be inserted in to the opening and is latched to the top surface 51a.F Thus, when the hook portion is inserted into the opening and is latched to the top surface 51 of the stand, the stand 50 will be positioned to the main body 10 of the TV 1. The hook portion can be a portion which will be inserted to the second opening 32 of the bottom 31 of the cabinet and is latched to the top surface 51a of the stand 50.

In addition, this invention can be applied to the following.

A flat panel display without the hook portion for the positioning, a flat panel display without structure of being fixed together with the supporting member, and a flat panel display without a structure of sandwiching the bottom portion of the cabinet between the stand and the supporting member are available for being applied with this invention.

This invention is not limited to the embodiment mentioned above. And following are also disclosed in this specification; namely, changing a combination of mutually substitutable members and structures disclosed in the above embodiments as necessary;

replacing and changing members or a combination of the members with well-known technology which is not disclosed in the above embodiments and is mutually substitutable with the members; and replacing and changing members or a combination of the members with the members or structures which an ordinary skilled person could substitute with the members disclosed in the above embodiments based on prior arts.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, reference to "first," "second," "third," and etc. members throughout the disclosure (and in particular, claims) is not used to show a serial or numerical limitation but instead is used to distinguish or identify the various members of the group.

What is claimed is:

1. A flat panel display, comprising:
   a main body having a cabinet that forms a display window on a front side and a display unit contained in the cabinet;
   a stand located beneath said main body;
   a supporting member that is fixed with said stand and supports said main body by fixing a back surface of said display unit at a position above said stand;
   said cabinet includes a front cabinet having said display window and a rear cabinet located behind said front cabinet;
   said supporting member has a stand fixation part that is fixed with said stand;
   said supporting member has a back fixation portion to fix the back surface of said display unit at a position above said stand fixation part;
   said supporting member is equipped with said back fixation portion in upper portion of said supporting member;
   said supporting member is equipped with a cabinet fixation portion to fix the cabinet;
   said cabinet fixation portion is in lower portion of said supporting member and under said display unit;
   said back fixation portion is behind said cabinet fixation portion and in parallel with said cabinet fixation portion;
   said supporting member is equipped with a connecting region that connects said back fixation portion and said cabinet fixation portion;
   said rear cabinet is equipped with a first boss that is formed to protrude forward from a position that faces said back fixation portion and abuts against said back fixation portion;
   said first boss of said rear cabinet, said back fixation portion and said back surface of said display unit are fixed together at a first position by a screw;
   said rear cabinet is equipped with a second boss which protrudes forward from a position that faces said cabinet fixation portion and abuts to said cabinet fixation portion;
   said front cabinet is equipped with a third boss that protrudes rearward from a position that faces said cabinet fixation portion and abuts to said cabinet fixation portion;
   said second boss, said cabinet fixation portion and said third boss are fixed together at a second position by a screw;
   said supporting member is formed integrally by bending metal plate such that said supporting member comprises said stand fixation part fixed with said stand, said back fixation portion to fix said display unit, said cabinet fixation portion and said connecting region between said back fixation portion and said cabinet fixation portion; and
   said second position where said second boss of said rear cabinet, said cabinet fixation portion of said supporting member and said third boss of said front cabinet are fixed together is provided at a more front side and a lower side than said first position where said first boss of said rear cabinet, said back fixation portion of said supporting member and said back surface of said display unit are fixed together, and is under said display unit.

2. The flat panel display of claim 1, wherein
   the supporting member is equipped with an evacuating portion that is shaped as being evacuated toward rear at upper portion, and
   said evacuating portion is equipped with the back fixation portion.

3. The flat panel display of claim 1, wherein
   said stand fixation part is formed at a lower end portion of the supporting member, and
   an opening is formed on one portion of said stand fixation part and top surface of the stand, and a latch portion is formed on another portion of said stand fixation part and said top surface of the stand for insertion into the opening and latching to the one portion.

4. The flat panel display of claim 3, wherein
   a bottom portion of the cabinet is located between the stand fixation part and the top surface of the stand,
   a second opening is formed on the bottom portion of the cabinet, and
   the latch portion is inserted into said opening of said one portion and said second opening, and the latch portion is latched with said one portion.

5. The flat panel display of claim 3, wherein
   the stand fixation part is equipped with a screw aperture in order to be fixed to the stand by a screw,
   an aperture for fastening is formed on the stand in order to let the screw pass through upward to the screw aperture when the latch portion is inserted through the one portion of the opening, and
   when the latch portion is inserted through the one portion of the opening and is latched to the one portion, the stand fixation part is fixed with the stand by the screw that passes through the aperture for fastening and screws with the screw aperture.

6. The flat panel display of claim 1, wherein
   said supporting member is equipped with a rear extending portion that extends upward from the stand,
   said supporting member is equipped with a front extending portion that extends frontward from an edge in a width direction of said rear extending portion,
   said supporting member is equipped with an outer extending portion that extends out in the width direction from a front edge of said front extending portion,
   said supporting member is equipped with a horizontally extending portion that is set horizontally and aligned with a hemline of said rear extending portion,
   said stand fixation part is formed on said horizontally extending portion,
   said outer extending portion is equipped with said back fixation portion in upper portion of said outer extending portion, and
   said outer extending portion is formed to let upper portion of said outer extending portion evacuate rearward.

7. The flat panel display of claim 1, wherein
   said cabinet is comprised of said front cabinet made of resin and formed to have a display window and said rear cabinet that is made of resin and located behind said front cabinet, said display panel is a liquid crystal display panel that is equipped with a left side panel screw aperture and a right side panel screw aperture that are to be fastened with said supporting member, said supporting member is equipped with a rear extending portion that extends upward from said stand, said supporting member is equipped with said left side front extending portion that extends frontward from a left edge of said rear extending portion, said supporting member is equipped with a right side front extending portion that extends frontward from a right edge of said rear extending portion, said supporting member is equipped with a left side outer extending portion that extends toward left from a front edge of said left side front extending portion, said supporting member is equipped with a right side front extending portion that extends toward right from front edge of said right side outer extending portion, said supporting member is equipped with a horizontally extending portion that is set horizontally and aligned with a hemline of said rear extending portion, said stand fixation part is formed on said horizontally extending portion, said left side outer extending portion is equipped with a left side evacuating portion that is evacuated rearward at a position of upper part, said right side outer extending portion is equipped with a right side evacuating portion that is evacuated rearward at a position of upper part, said left side evacuating portion and said right side evacuating portion are equipped with back fixation portions, a first aperture for fastening is formed on said back fixation portions in order to let a screw pass through said back fixation portion toward said left side panel screw aperture from rear side, a second aperture for fastening is formed on said back fixation portions in order to let a screw pass through said back fixation portion toward said right side panel screw aperture from rear side, a third aperture for fastening is formed on said left side extending portion at a position of lower position than said display panel, a forth aperture for fastening is formed on said right side outer extending portion at a position of lower position than said display panel, said first boss includes a first left side boss and a first right side boss, said rear cabinet is equipped with said first left side boss that protrudes frontward from a position that faces said left side evacuating portion and abuts to said back fixation portion, said rear cabinet is equipped with said first right side boss that protrudes forward from a position that faces said right side evacuating portion and abuts to said back fixation portion, said second boss includes a second left side boss and a second right side boss, said rear cabinet is equipped with said second left side boss that protrudes forward from a position that faces said left side outer extending portion at a position that is lower than said position of said first left side boss and abuts to said left side outer extending portion, said rear cabinet is equipped with said second right side boss that protrudes forward from a position that faces said right side outer extending portion at a position that is lower than said position of said first light side boss and abuts to said right side outer extending portion, a fifth aperture for fastening is formed on said first left side boss to enable a screw pass through said first left side boss to said panel screw apertures from rear, a sixth aperture for fastening is formed on said first right side boss to enable a screw pass through said first right side boss to said panel screw apertures from rear, a seventh aperture for fastening is formed on said second left side boss to enable a screw pass through said second left side boss to said third aperture for fastening of said left side outer extending portion from rear, an eighth aperture for fastening is formed on said second right side boss to enable a screw pass through said second right side boss to said forth aperture for fastening of said right side outer extending portion from rear, said third boss includes a third left side boss and a third right side boss, said front cabinet is equipped with said third left side boss that protrudes rearward at a position facing said second left side boss and abuts to said left side outer extending portion, said front cabinet is equipped with said third right side boss that protrudes rearward at a position facing said second right side boss and abuts to said right side outer extending portion, a first opening is formed on said horizontally extending portion, said bottom portion of said cabinet is located at a position between said horizontally extending portion and said top surface of said stand, said second opening is formed on said bottom portion of said cabinet, a hook portion is formed on said top surface of said stand for insertion into said second opening and said first opening and to be latched to said horizontally extending portion, a metal plate screw aperture that is fixed with said stand by a screw is formed on said horizontally extending portion, a ninth aperture for fastening is formed on said bottom portion of said cabinet in order to let a screw pass through upward to said metal plate screw aperture, said stand is equipped with a tenth aperture for fastening that enables said metal plate screw pass through upward to said metal plate screw aperture when said hook portion is inserted through said second opening and said first opening and finally latched to said horizontally extending portion, said first position includes a first left side position and a first right side position, said first left side boss and said left side evacuating portion and said liquid crystal display panel are fixed together at said first left side position by a screw when said screw passes through said fifth aperture for fastening of said first left side boss and said first aperture for fastening of said left evacuating portion and screws into said left side panel screw aperture, said first right side boss and said right side evacuating portion and said liquid crystal display panel are fixed together at said first right side position by a screw when said screw passes through said sixth aperture for fastening of said first right side boss and said second aperture for fastening of said right side evacuating portion and fastens into said right side panel screw aperture, said second position includes a second left side position and a second right side position, said second left side boss and said left outer extending portion and said third left side boss are fixed together at said second left position by a screw when said screw passes through said seventh aperture for fastening of said second left side boss and said third aperture for fastening of said left side outer extending portion and screws into said third left side boss, said second right side boss and said right side outer extending portion and said third right side boss are fixed together at said second right position by a screw when said screw passes through said eighth aperture for fastening of said second right side boss and said forth aperture for fastening of said right side outer extending portion and screws into said third right side boss, and when said hook portion is inserted through said second opening and said first opening and finally latched to said horizontally extending portion, a screw passes upward through said tenth aperture for fastening of said stand and said ninth aperture for fastening of said bottom portion of said cabinet and screws into said metal plate screw aperture, and said horizontally extending portion is fixed with said stand.

8. The flat panel display of claim 1, wherein
said connecting region connecting said back fixation portion with said cabinet fixation portion is inclined at 45 degrees from vertical direction.

9. The flat panel display of claim 1, wherein
said connecting region connecting said back fixation portion with said cabinet fixation portion has a curved surface shape.

10. The flat panel display of claim 1, wherein
said supporting member is equipped with a rear extending portion that extends upward from the stand, said supporting member is equipped with a front extending portion that extends frontward from an edge in a width direction of said rear extending portion, said supporting member is equipped with an outer extending portion that extends out in the width direction from a front edge of said front extending portion, said supporting member is equipped with a horizontally extending portion that is set horizontally and aligned with a hemline of said rear extending portion, said stand fixation part is formed on said horizontally extending portion, said outer extending portion is equipped with said back fixation portion in upper portion of said outer extending portion, and said outer extending portion is equipped with said cabinet fixation portion in lower portion of said supporting member, the cabinet fixation portion being under said display panel.

11. The flat panel display of claim 1, wherein
said supporting member is equipped with a horizontally extending portion that is set horizontally below said cabinet fixation portion;

said stand fixation part is formed on said horizontally extending portion;

said supporting member having said horizontally extending portion is put inside said cabinet;

said horizontally extending portion of said supporting member is in direct contact with an inner surface of a bottom portion of said cabinet;

a top surface of said stand is in direct contact with an outer surface of said bottom portion of said cabinet; and said horizontally extending portion of said supporting member, said bottom portion of said cabinet, and said stand are fixed together by a screw while said bottom portion of said cabinet is put between said horizontally extending portion of said supporting member and said top surface of said stand.

\* \* \* \* \*